United States Patent [19]

Millett

[11] Patent Number: 4,794,638

[45] Date of Patent: Dec. 27, 1988

[54] TELEPHONE ANSWERING MACHINE DISPLAY SYSTEM

[75] Inventor: Peter A. Millett, Lake Oswego, Oreg.

[73] Assignee: Code-A-Phone Corporation, Clackamas, Oreg.

[21] Appl. No.: 141,201

[22] Filed: Jan. 6, 1988

[51] Int. Cl.$^4$ .......................... H04M 1/00; H04M 1/65
[52] U.S. Cl. ........................................ 379/88; 379/396
[58] Field of Search ...................... 379/88, 89, 396, 164

[56] References Cited

U.S. PATENT DOCUMENTS

| | | | |
|---|---|---|---|
| 4,359,607 | 11/1982 | Hannig et al. | 379/88 |
| 4,468,813 | 8/1984 | Burke et al. | 455/38 |
| 4,488,005 | 12/1984 | Frantz | 379/88 |
| 4,518,827 | 5/1985 | Sagara | 379/88 |
| 4,549,047 | 10/1985 | Brian et al. | 379/88 |
| 4,616,110 | 10/1986 | Hashimoto | 379/88 |
| 4,677,657 | 6/1987 | Nagata et al. | 379/63 |
| 4,726,059 | 2/1988 | Havel | 379/354 |

FOREIGN PATENT DOCUMENTS 8213097 11/1982 United Kingdom .................. 379/88

Primary Examiner—Thomas W. Brown
Attorney, Agent, or Firm—Stoel Rives Boley Jones & Grey

[57] ABSTRACT

The present invention constitutes a display system for use in a telephone answering machine for indicating when messages are available for playback in the memory of the machine. The system comprises a display unit having a plurality of display modules which correspond operationally to various banks of memory within the answering machine and a microprocessor for providing control signals to the display modules. The display modules include mechanisms for generating light of a first color and for generating light of a second color in response to different logic states assumed by the control signals from the microprocessor. The display modules are controlled by the microprocessor to emit light of the first color when messages are resident in particular banks to which they correspond within the memory of the machine and emit light of a second color when such banks are empty.

10 Claims, 7 Drawing Sheets

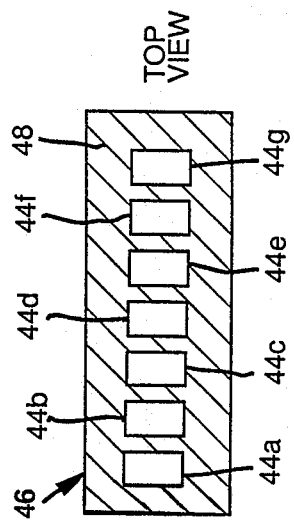
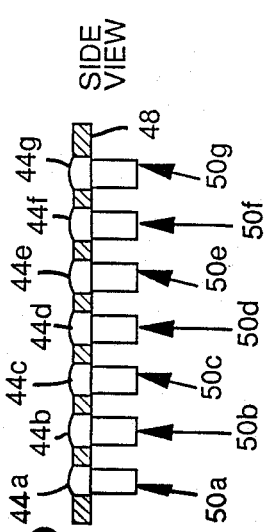
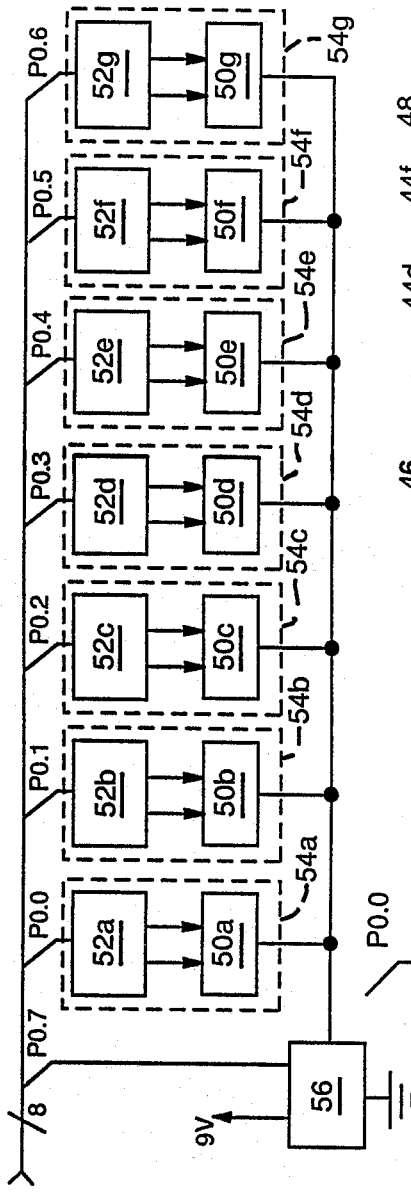
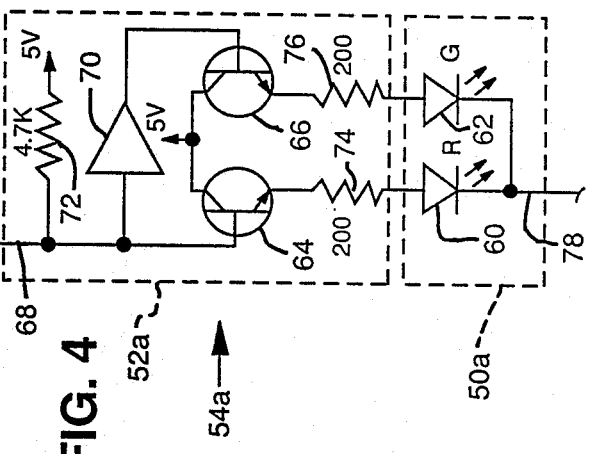
FIG. 2a
FIG. 2b
FIG. 3
FIG. 4

MAIN PROGRAM

RING / ANSWER ROUTINE

MESSAGE / MEMO RECORD ROUTINE

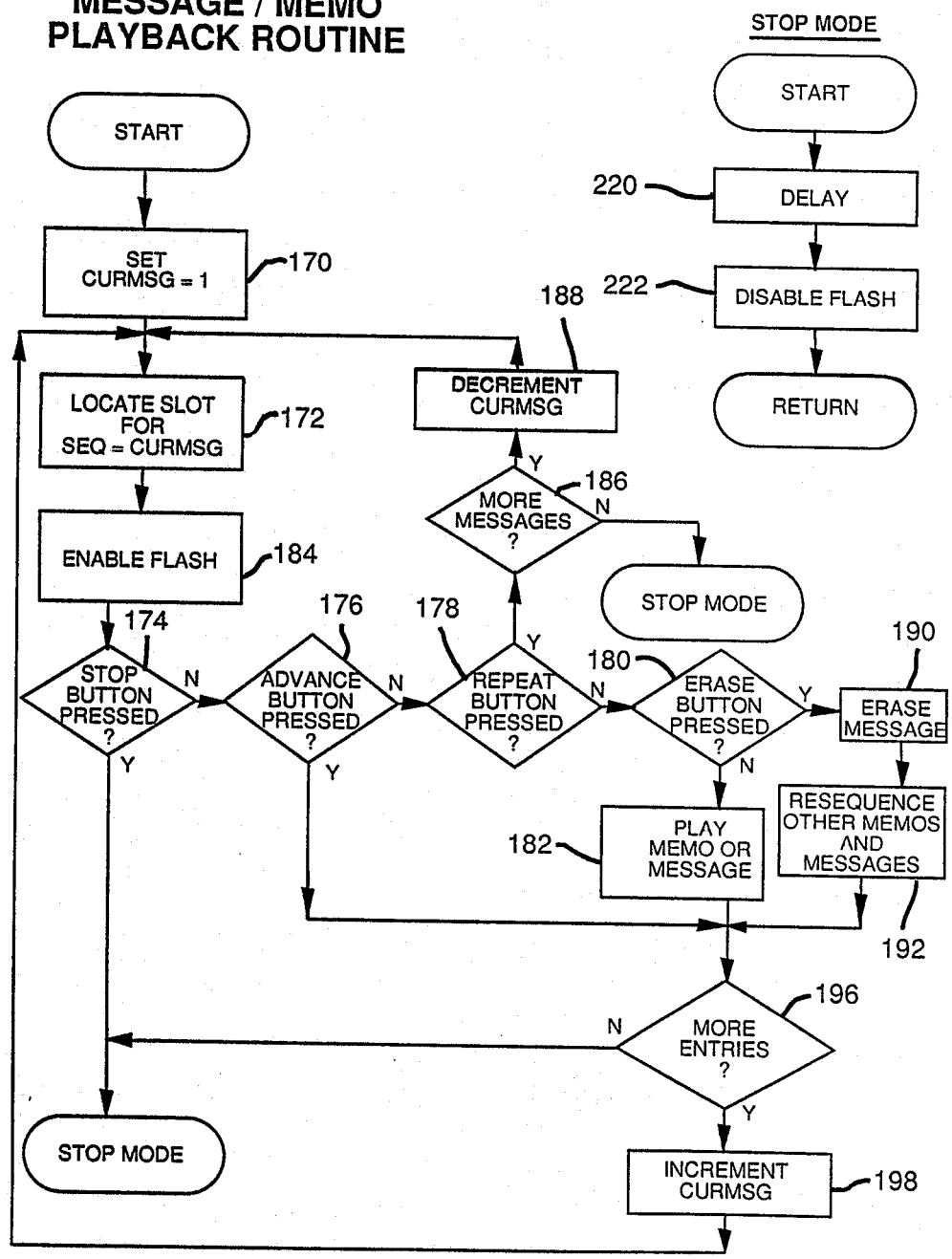

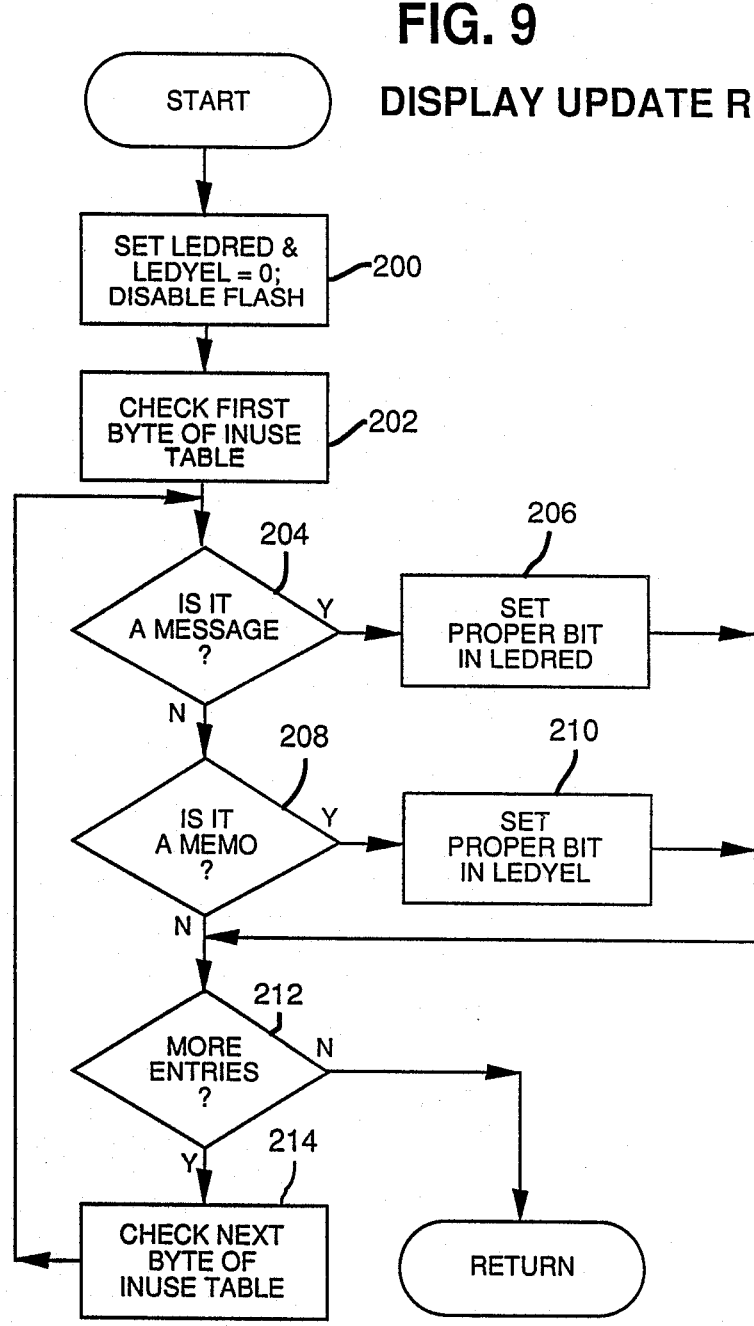

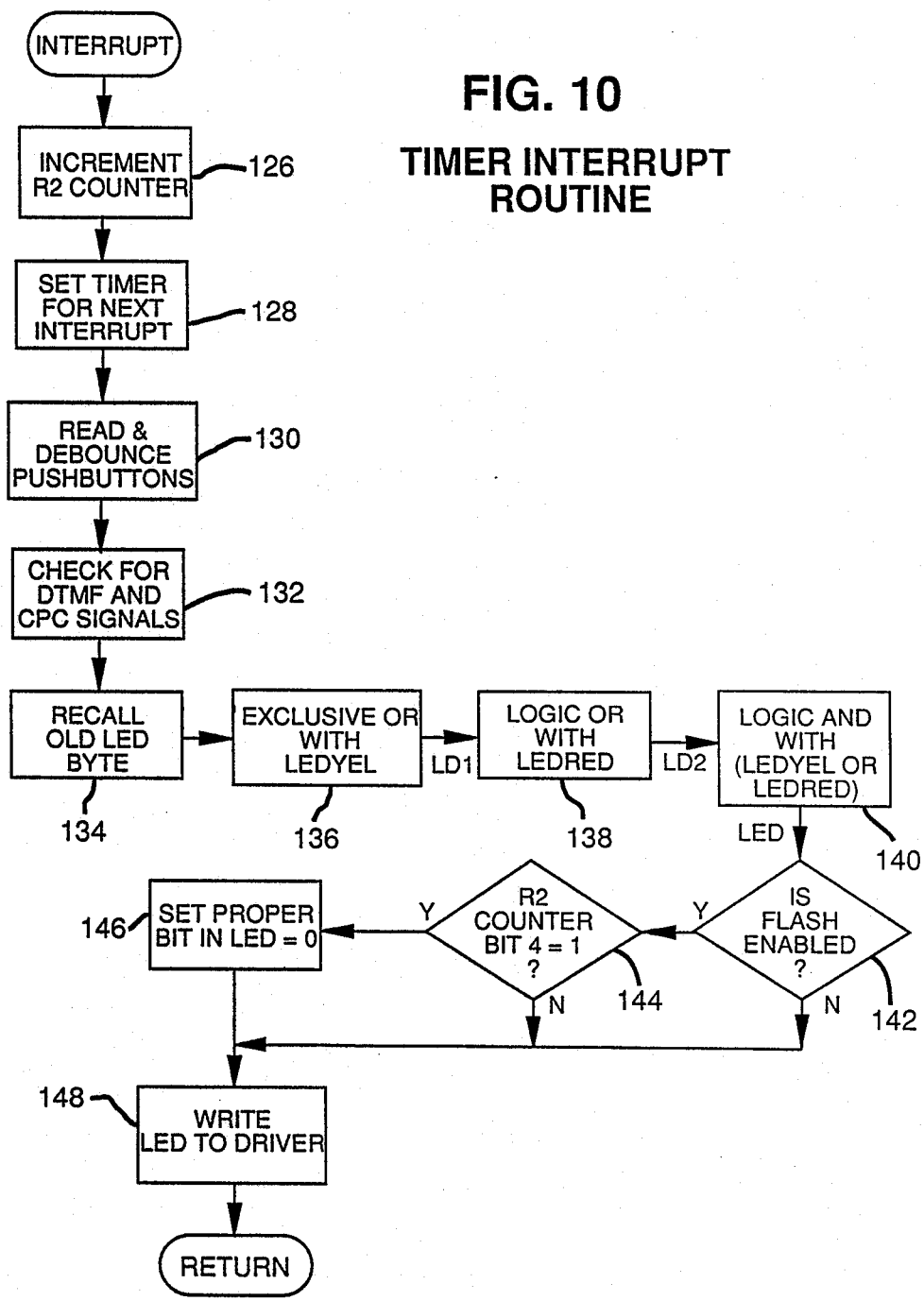

TELEPHONE ANSWERING MACHINE DISPLAY SYSTEM

BACKGROUND OF THE INVENTION

The present invention relates to telephone answering machines and more particularly to systems for indicating when messages are available for playback in the memory of such machines and for associated memory management functions within solid state telephone answering machines.

In the past telephone answering machines have recorded messages on magnetic tape. The messages were then available for playback serially in the order in which received. However, no function was provided for displaying the number of messages present in memory and the number of empty slots or memory banks available for new messages. Further, no capability was generally provided to access messages out of the order in which they were received.

It is therefore an object of the present invention to provide a system for displaying the number of messages present in the memory of a telephone answering machine and the number of available memory banks for recording additional messages.

It is another object of the present invention to provide a memory management system for a telephone answering machine which operates in cooperation with a message display system for selecting messages for playback in accordance with the display and which allows messages to be rapidly accessed in any order desired.

It is a further object of the present invention to provide a display and memory management system for a solid state telephone answering machine which is economical to produce and efficient in operation.

SUMMARY OF THE INVENTION

The present invention constitutes a display and associated memory management system for use in a telephone answering machine for indicating when messages are recorded in the memory of the answering machine and are available for playback. The system comprises a set of display modules which operationally correspond to various banks of memory within the machine which are adapted for storing messages. The display modules are constructed for generating light of a first color or, alternatively, light of a second color in response to the different logic states of a digital control signal provided to each module.

The system also includes a microprocessor which provides the control signals to the display modules. The microprocessor generates the control signals so that the display modules provide light of the first color when messages are available in the memory banks of the memory and provide light of the secod color when memory banks are empty. The display modules are arranged in an array. Messages resident in memory are indicated by the modules generating light of the first color in chronological order as recorded starting from one end of the array. The number of empty memory banks is shown by the modules generating light of the second color at the other end of the array.

In the preferred embodiment the microprocessor also provides control signals which rapidly toggle from one logic state to another, thereby providing light of a third color which is employed to indicate the presence in memory of a locally recorded memo-messages. Additionally, the microprocessor manages the memory of the system so that messages may be promptly selected in accordance with the display provided and played back on a random access basis.

BRIEF DESCRIPTION OF THE DRAWINGS

FIGS. 2a and 2b are diagrammatic top and side views of an array of display module components in accoraance with the present invention.

FIG. 3 is a block diagram of a display unit including several display modules in accordance with the present invention.

FIG. 4 is an electrical schematic diagram of an individual display module component in accordance with the present invention.

FIG. 8 is a flow chart of the message/memo playback routine of the software of the present invention for operationally controlling the hardware components of the invention.

FIG. 9 is a flow chart of the display update routine of the software of the present invention for operationally controlling the hardware components of the invention.

FIG. 10 is a flow chart of the timer interrupt routine of the software of the present invention for operationally controlling the hardware components of the invention.

DESCRIPTION OF THE PREFERRED EMBODIMENT

Figure 1:
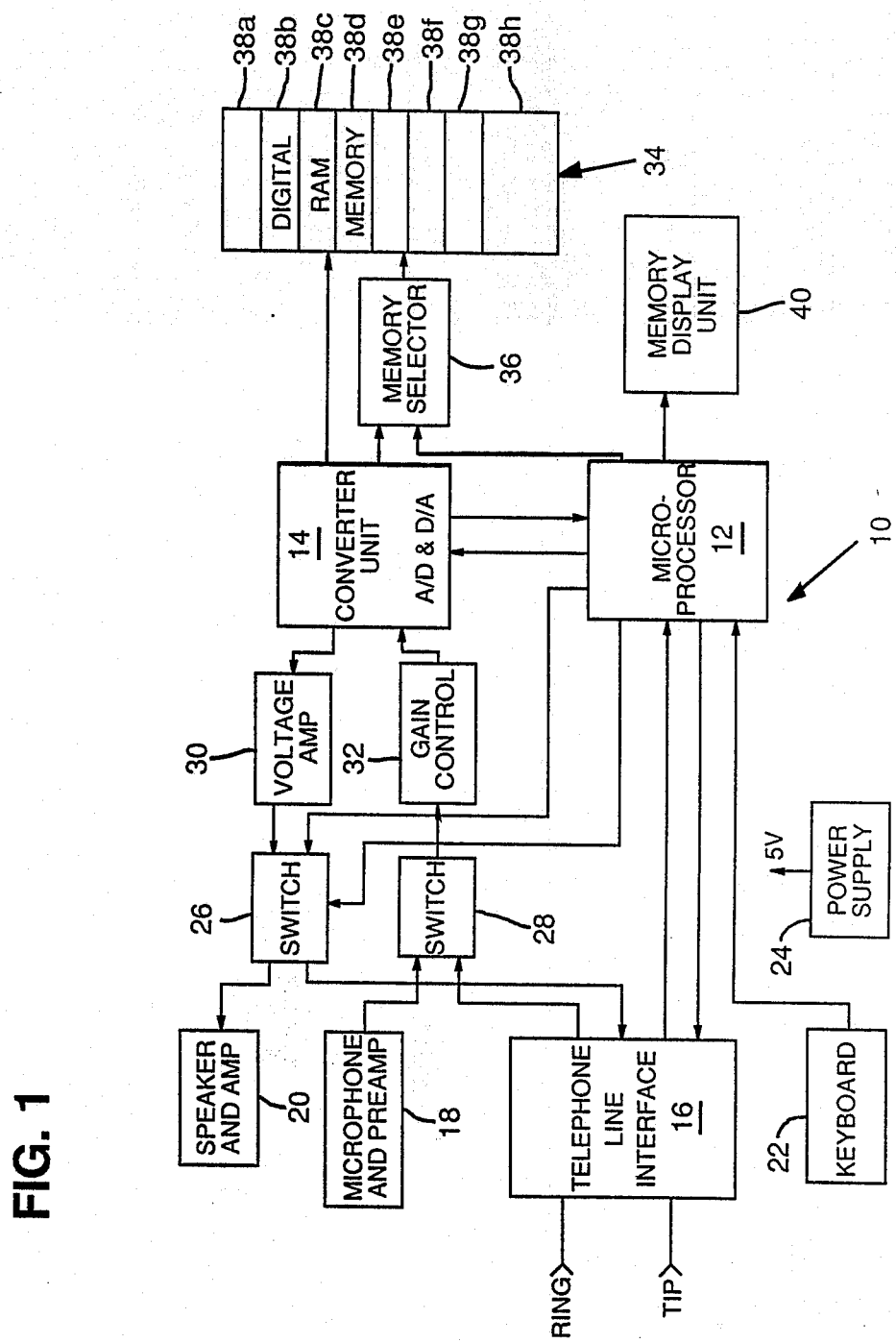
FIG. 1 is an overall block diagram of a hardware system for a telephone answering machine which includes the present invention.

Referring now to FIG. 1, an overall block diagram is shown of a telephone answering machine 10 which incorporates the present invention as a part of its operational system. The machine 10 includes a microprocessor 12 such as an Intel 8051 microprocessor chip for controlling and coordinating the operation of the various parts of the system pursuant to the software program for the invention. A converter unit 14 such as a Toshiba T6668 chip transforms analog signals representing speech into digital form and likewise transforms digital signals representing speech into analog form.

The machine 10 also includes an interface unit 16 for coupling the machine 10 to the tip and ring crrcuits of a conventional telephone line. The interface unit 16 may comprise a detector circuit for detecting ring signals and a circuit for determining when a calling party has terminated a call, which circuits generate digital signals that are provided to the microprocessor 12. The unit 16 may also include a dual tone multi-frequency (DTMF) decoder for allowing remote control of the machine 10 over the telephone line to which it is coupled.

The machine 10 further includes a microphone and preamplifier 18 for allowing memo-messages and announcements to be locally recorded, and a speaker and amplifier 20 for allowing messages (and memo-messages) recorded within the machine 10 to be locally monitored. A keyboard unit 22 allows the operator to direct the operation of the machine 10 by providing input commands to the microprocessor 12. The power supply 24 of the machine 10 may comprise a switching regulator for providing a stable source of DC at low voltage to the active components o the machine 10.

A switch 26 regulates whether audio output signals representing speech or signal tones are provided either to the speaker and amplifier 20 or the interface unit 16 in response to control signals from the microprocessor 12. A switch 28 regulates whether audio input signals from either the interface unit 16 or the microphone and preamplifier 18 are provided for processing to the other components of the machine 10. Audio output signals representing speech are supplied to the switch 26 from the converter unit 14 by way of a voltage amplifier 30. Audio input signals from the switch 28 are supplied by way of a gain control unit 32 to the converter unit 14.

The converter unit 14 is connected by data, address and control lines to a RAM memory unit 34. The memory unit 34 is divided into eight memory banks or blocks 38a–38h which are selected for use by the memory selector 36 in response to control signals from both the microprocessor 12 and the converter unit 14. The various banks 38a–38h of memory within the unit 34 are adapted to record up to seven messages (including memo-messages) and one announcement eight messages in digital form, as provided by the converter unit 14 which operates by converting analog input audio signals into digital signals. Converter unit 14 samples analog input audio signals at either 16 Khz or 32 Khz depending on the quality of the playback desired.

The machine 10 also includes a memory display unit 40 which is controlled by the microprocessor 12 to provide a visual display for indicating whether messages or memo-messages have been recorded into the various banks 38a–38g of the memory unit 34 as described below in greater detail.

After connection to a suitable telephone circuit, the machine 10 may be activated and operated by the user by utilizing the keyboard 22. The user records an announcement in bank 38h of the memory unit 34 for playback to calling parties. Bank 38h is specially reserved for announcement messages. Since the announcement message is repetitively used as an initial greeting to calling parties, it is sampled by converter unit 14 at 32 Khz to improve reproduction quality. In response to the announcement, calling parties may leave messages for the operator of the machine 10. The messages are stored in the banks 38a–38g of the memory unit 34. These messages oould usually be sampled at 16 Khz so that less memory is required for each message. For a memory unit 34 containing three megabits of memory, up to seven twenty-one second messages may be recorded in addition to the announcement. The messages from the calling parties may be played back through the speaker and amplifier 20 when desired by the operator by utilizing the keyboard 22 to provide the required commands to the microprocessor 12.

The answering machine 10 additionally provides the capability of locally recording memo-messages through use of the microphone and preamplifier 18. Memo-messages (which may be considered to be an alternative type of message and may also be called "memos") are stored and played back in a fashion similar to messages left by calling parties.

The memory display unit 40 provides a unique visual indication of the utilization status of the banks 38a–38g of the memory unit 34 by generating a set of visual signals corresponding to the memory banks 38a–38h. For each memory bank 38a–38g a red signal is generated if the bank contains a message from a calling party, a yellow signal is generated if the bank contains a memo-message and a green signal is generated if the bank is empty.

Referring now to FIGS. 2a and 2b, the visual signals are provided by display units 50a–50g each of which includes a pair of light emitting diodes which are positioned below a set of lenses 44a–44g which are structurally mounted in a linear array 46 on the top face 48 of the machine 10 so as to be readily visible to the operator. Each one of the display units 50a–50g includes a light-emitting diode for generating red light and a light-emitting diode for generating green light. Light that the operator perceives as yellow is generated by rapidly switching between the red and green light-emitting diodes.

Referring now to FIG. 3, the display units 50a–50g function in cooperation with electrical circuits 52a–52g which are operative for separately regulating current flow through the unit 50a–50g in response to control signals from the microprocessor 12. Display units 50a–50g are connected to electrical circuits 52a–52g, respectively. The electrical circuits 52a–52g receive control signals P0.0–P0.6, respectively, from the microprocessor 12. The display units 50a–50g and the respective electrical circuits 52a–52g with which they are associated may be considered to comprise the display modules 54a–54g, respectively. The display modules 54a–54g function in response to the control signals P0.0–P0.6 to generate either red or green light at any given instant depending on the logic state of the control signal. The light generated by each display module is radiated out through the corresponding one of the lenses 44a–44g in order to provide the desired visual indication function.

The display modules 54a–54g are of similar construction. Referring now to FIG. 4, the module 54a is shown in detail as an example illustrating the structure of all of the modules. The module 54a includes a display unit 50a having a red light-emitting diode 60 and a green light-emitting diode 62. The module 54a also includes a circuit 52a that regulates current flow and comprises a first bipolar NPN transistor 64 and a second bipolar NPN transistor 66. The base of the first transistor 64 is connected to a lead 68 carrying the control signal P0.0 from the microprocessor 12. The circuit 52a further comprises an inverter 70 having an input which is connected to the lead 68 in order to also receive the control signal P0.0. The base of the transistor 66 is connected to the output of the inverter 70. A pull-up resistor 72 is connected between the lead 68 and the DC voltage supply 24 (FIG. 1) to regulate the voltage developed by the control signal P0.0. The collectors of the transistors 64 and 66 are connected to the DC voltage supply 24. The resistors 74 and 76 are connected between the emitters of the transistors 64 and 66, respectively, and the nodes of diodes 60 and 62, respectively. The cathodes of diodes 60 and 62 are connected to a lead 78 that is connected through a switch circuit 56 to ground. The resistors 74 and 76 help control current flow through the diodes 60 and 62.

The module 54a functions to generate red light when the logic state of the control signal P0.0 is high and to generate green light when the logic state of the control signal P0.0 is low. The transistors 64 and 66 are configured as emitter followers which operate as switches in response to the control signal P0.0 for supplying current to diode 60 when P0.0 is high and, alternatively, the diode 62 when P0.0 is low.

The modules 54*1*-54*b* in combination with the lenses 44*a*-44*g* in the array 46 comprise the complete memory display unit 40. The circuit 56 shown in FIG. 3 operates as a switch to disconnect the modules 54*a*-54*g* from ground when the control signal P0.7 is high or when line power is terminated.

As will be further described with reference to the flowcharts in FIGS. 5-10, during operation of the system the modules 54*a*-54*g* directly correspond on a chronological basis to messages and memo-messages recorded within various memory banks 38*a*-38*g* of the memory unit 34 and operationally correspond on a one-for-one basis with the memory banks 38*a*-38*g*. However, it should be noted that particular modules 38*a*-38*g* do not always correspond to the same memory bank but rather correspond to such banks primarily on the basis of chronological "sequence numbers" assigned to the messages and memo-messages recorded in memory.

Figure 5:
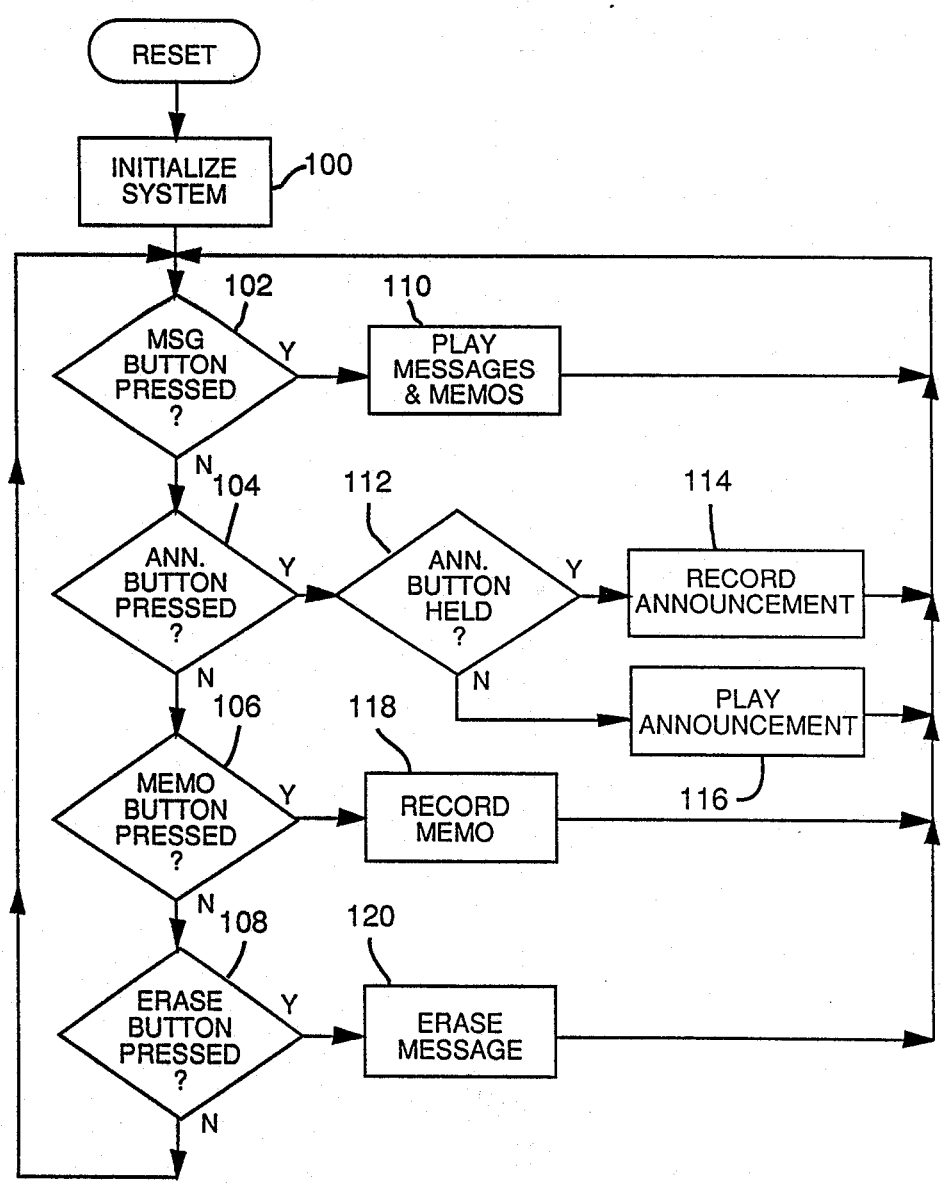
FIG. 5 is a flow chart of the main program of the software of the present invention for operationally controlling the hardware components of the invention.

Referring now to FIG. 5, a flowchart is shown illustrating the steps in the main microcode program for the microprocessor 12. In the first step 100 the system is initialized when power is first applied and the machine 10 is turned on. Steps 102, 104, 106 and 108 check for input commands from the keyboard 22 which are produced when various of the keyboard buttons are pressed. In accordance with step 102 the program directs the machine 10 to playback messages (and locally recorded memo-messages) in step 110 if the message button has been pressed. If the message button is not detected as having been pressed the program proceeds to step 104. In accordance with step 104 the program advances to step 112 if the announcement button has been pressed. In step 112 the program directs the machine 10 to record an announcement in step 114 if the announcement button is continuously held down or, alternatively, to playback a previously recorded announcement in step 116 if the announcement button has been released. If the announcement button is not detected as having been pressed, the program proceeds to step 106 in which the machine 10 is directed in step 118 to locally record a memo-message if the memo button has been pressed. If the memo button is not detected as having been pressed, the program proceeds to step 108 in which the machine is directed in step 120 to erase all the messages in the memory unit 34 if the erase button has been pressed. If the erase button is not detected as having been pressed and upon completion of the steps 110, 114, 116, 118 and 120, the program returns to step 102.

Figure 6:
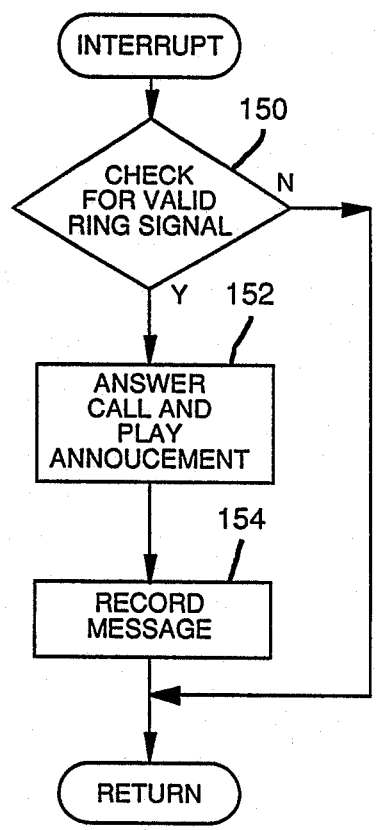
FIG. 6 is a flow chart of the ring/answer routine of the software of the present invention for operationally controlling the hardware components of the invention.

Referring now to FIG. 6, a flowchart is shown for the ring/answer routine which interrupts the main program upon receipt of a ring signal. When a ring signal is initially detected by the interface 16 which accordingly signals the microprocessor 12 the program proceeds to step 150 in which the microprocessor 12 checks to make sure that a valid ring signal with a sufficient number of rings has been received. If it is determined in step 150 that a valid ring signal was not received the routine returns to the main program by terminating the interrupt sequence. If, however, the ring signal is determined to be valid the program proceeds to step 152 in which the microprocessor 12 is directed to answer the call and play the announcement recorded in bank 38*h* of the memory unit 34. After the announcement is played the program then proceeds to step 154 in which the microprocessor 12 is directed to allow the calling party to record a message. Thereafter, the routine returns to the main program.

Figure 7:
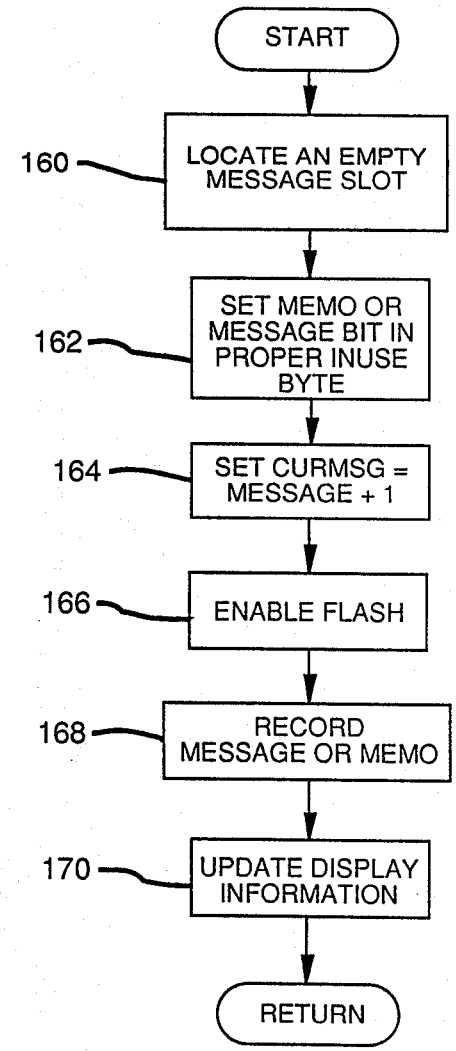
FIG. 7 is a flow chart of the message/memo record routine of the software of the present invention for operationally controlling the hardware components of the invention.

Referring now to FIG. 7, a flowchart is shown for the routine employed in recording messages and memo-messages. The routine is entered from either step 118 in the main program or step 154 in the ring/answer routine. The routine progresses sequentially through steps 160, 162, 164, 166, 168 and 170. In the first step 160 the routine locates an empty memory slot or bank 38*a*-38*g* in the memory unit 34 in which an incoming message or memo-message can be recorded.

In step 162 the routine sets one of two special bits termed "memo" and "message" bits within a special data byte corresponding to the empty memory bank located in step 160. A separate data byte termed an "INUSE" byte corresponds to each memory bank 38*a*-38*g*. The INUSE byte contains information about any message recorded in the memory bank to which it corresponds. Seven INUSE data bytes corresponding to the seven memory banks 38*a*-38*g* are held in the microprocessor's memory and form a table of such data bytes called the "INUSE" table. It should also be noted that the INUSE bytes contain four special bits called "SEQ" bits which form sequence numbers which are used to numerically track the messages (and memo-messages) in chronological order as received. The bit designated the memo bit within the INUSE byte for the memory bank located in step 160 is set high if a memo-message is being recorded. The bit designated the message bit is set high if a message is being recorded.

In step 164 the SEQ bits within the INUSE byte corresponding to the memory bank located in step 160 are set equal to the total number of memo-messages and messages in memory plus one in order to thereby provide a number for numerically tracking the message or memo-message recorded in the memory bank. In step 165 the flash function is enabled by setting a special flag within the memory of the microprocessor. In step 166 the program directs the microprocessor 12 to record the memo-message or message into the empty memory bank located in step 160. After step 166 is completed, the routine proceeds to step 168 in which the information for controlling the memory display unit 40 is updated. Thereafter the routine returns to the main program.

Referring now to FIG. 8, a flowchart is shown for the routine employed for playing back messages and memo-messages. The routine is entered from step 110 in the main program. In the first step 170 a data byte termed the "CURMSG" byte which is used for designating particular messages and memo-messages is set equal to one. In step 172 following step 170 the program locates the memory bank for which the SEQ bits in the INUSE byte corresponding to the bank are numerically equal to the CURMSG byte. In steps 174, 176, 178, and 180 the program sequentially checks to see whether the any of the stop, advance, repeat or erase buttons on the Keyboard 22 have been pressed. In step 174 the routine enters stop mode if the stop button was pressed. In stop mode the routine awaits further commands from the operator in step 220 for a predetermined period such as 10 seconds. If no further commands are received the routine returns to the main program after disabling the flash function in step 222. In step 176 the routine jumps to step 196 if the advance button was pressed. In step 178 the routine jumps to step 186 if the repeat button was pressed. In step 186 the routine enters stop mode if the CURMSG byte has a value equal to one. Otherwise the routine proceeds to step 188 in which the routine decrements CURMSG by one and thereupon returns to step 172. In step 180 the routine either goes forward to step 182 if the erase button has not been pressed or proceeds instead to step 190 if the erase button was pressed. In step 190 the message in the memory bank for which the SEQ bits in the INUSE byte corresponding to the bank are equal to CURMSG is erased from memory. Thereafter, in step 192 the routine resequences the other messages and memo-messages so that the SEQ bits in the INUSE bytes reflect a proper continuous (and chronological) ascending order between messages and memo-messages resident in memory. In step 182 the routine directs the microprocessor 12 to play the message or memo-message in the memory bank for which the SEQ bits in its INUSE byte equal the CURMSG byte. After the message or memo-mesage has been played the routine proceeds to step 196 in which it is determined whether there are any more messages or memo-messages which can be played. If the last message or memo-message has been played the routine enters stop mode. If more messages are resident in memory the routine proceeds to step 198 in which the CURMSG byte is incremented by one. The routine then returns to step 172. Among other things, the message/memo playback routine allows messages and memo-messages to be selected on the basis of the display provided by the unit 40 and promptly accessed and played back on a random access basis.

Referring now to FIG. 9, a flowchart is shown for the display update routine. The routine is entered from step 168 in the message/memo record routine or step 192 in the message/memo playback routine after the INUSE bytes are resequenced. Two data bytes termed the "LEDYEL" and "LEDRED" bytes are stored in special microprocessor registers and used to hold display information. Byte LEDYEL has seven bits which correspond to the seven memory banks. When memo-messages are resident in memory, data bits within byte LEDYEL are set high in accordance with the chronological order of memo-messages among all the memo-messages and messages. Byte LEDRED also has seven bits which correspond to the seven memory banks. When messages (separate from memo-messages) are resident in memory, data bits within the byte LEDRED are set high in accordance with the chronological order of the messages among all the messages and memo-messages. The routine shown in FIG. 9 updates the bytes LEDYEL and LEDRED. In step 200 all the data bits in bytes LEDYEL and LEDRED are set low. The routine then proceeds to step 202 in which the INUSE data byte in the INUSE table corresponding to a first memory bank is recalled. The message bit in this byte is then checked in step 204. If the message bit is high and the presence of a message is thereby indicated, the routine jumps to step 206 in which the data bit in LEDRED corresponding (by significance level) to the sequence of the message is set high. If the message bit is low the routine goes forward to step 208 in which the memo bit is checked. If the memo bit is high and the presence of a memo-message is thereby indicated, the routine jumps to step 210 in which the data bit in LEDYEL corresponding (by significance level) to the sequence of the memo-message is set high. If the memo bit is determined to be low in step 208 and also after both steps 206 and 210, the routine proceeds to step 212 in which the INUSE table is checked for more INUSE data byte entries corresponding to messages or memo-messages in memory. If no more such data bytes exist the routine returns to the main program. If more INUSE data byte entries correlating with messages and memo-messages resident in memory are present in the INUSE table the routine proceeds to step 214 and the next such data byte is recalled. After step 214, the routine returns again to step 204.

Referring now to FIG. 10, a flowchart is shown for the timer interrupt routine which is periodically executed by the microprocessor 12 on 10 millisecond intervals. In the first step 126 a counter termed the "R2" counter and which is used in controlling the flash is incremented by one. In step 128 the timer used in providing the interrupts is reset to provide another interrupt after the next 10 millisecond interval. In step 130 the pushbuttons of the keyboard 22 are read and debounced. In step 132 the microprocessor 12 is directed to check for calling party control and remote (DTMF) inputs from the interface 16. The steps 134, 136, 138 and 140 are sequentially performed and involve computations required for determining the proper logic states for seven bits of a data byte called the LED byte held in a special microprocessor register for use in setting the control signals P0.0–P0.6 in accordance with whether memo-messages and messages are present in the memory unit 34.

The data bits of the bytes LEDYEL and LEDRED provide the necessary information to set the data bits of the byte LED. In step 134 the routine recalls the data comprising the byte LED used for setting the control signals P0.0–P0.6 pursuant to the previous interrupt sequence. In step 136 each bit of data from byte LED is subject to an Exclusive-OR operation with each bit of data at an equivalent significance level in the data from the byte LEDYEL in order to produce a new byte of data LD1. Consequently, whenever a bit in LEDYEL is high the data from LED may be considered to toggle from high to low or low to high in forming the bits of the byte LD1. In step 138 each bit of data from the byte LD1 produced in step 136 is subject to an OR operation with each bit of data at an equivalent signficance level in the data from byte LEDRED in order to produce a new byte of data LD2. Whenever a bit within LEDRED is high a high bit is produced in the byte LD2. In step 140 the bits of data comprising the byte LD2 produced in Step 138 are subject to an AND operation with each bit of data at an equivalent significance level in a special byte of data produced as a result of an OR operation (again using bits at eqiivalent significance levels) between the data from bytes LEDYEL and LEDRED. The AND operation of step 140 produces a new data byte LED. Whenever neither of the bits at a particular signficance level from byte LEDYEL or byte LEDRED are high a low data bit is produced in LED. The data byte LED which is produced as a result of steps 134, 136, and 138 contains data bits which assume a particular logic state at a given instant in accordance with the utilization status (occupied or empty) of the memory banks in th memory unit 34. The bits in LED are high if the memory banks to which the bits correspond are occupied by messages or memo-messages but are low if the memory banks to which the bits correspond are empty. It should be noted that for periods extending over multiple numbers interrupt sequences particular data bits in LED corresponding to memo-messages may considered to assume an intermediate condition in which they toggle between high and low logic states due to the effect of the Exclusive-OR operation in step 136. The logic states assumed by the bits in the byte LED cause the control signals P0.0–P0.6 to assume similar states and direct particular display units corresponding to messages and memo-messages to emit red and yellow light, respectively, and otherwise to emit green light. The display unit 40 is thereby regulated to separately identify and indicate the presence of messages and memo-messages in various banks of the memory unit 34 as well as the existence of unoccupied memory banks. Furthermore, the messages and memo-messages are indicated in chronological order from one end of the array 46 toward the other.

After step 140 the routine proceeds to step 142 in which the flag indicating whether the flash is enabled is checked. If the flash is not enabled the program jumps to step 148 in which the data from byte LED is output to the microprocessor driver for the control signals P0.0–P0.6. Alternatively, if the flash is enabled, the routine proceeds to step 144 in which the R2 counter is checked to see if bit 4 of the counter is high. If bit 4 of the R2 counter is low the routine jumps to step 148. If, however, bit 4 of the R2 counter is high, the routine proceeds to step 146 in which the bit at the significance level in the LED byte corresponding to the value of CURMSG byte is set low. After step 146 the routine proceeds to step 148 previously described and thereafter returns to the main program or whatever other routine was previously underway. Steps 142, 144 and 146 implement the flash function and cause particular display units corresponding to messages or memo-messages which are being recorded or played, etc. to flash from green to red or green to yellow at low frequency during such operations. Among other things, the flash function assists the operator in selecting particular messages or memo-messages indicated by the display provided by the display unit 40 for special processing such as playback, etc.

As may be apparent from the preceding description, certain changes may be made in the above constructions without departing from the scope of the invention. Therefore, the embodiment described and the drawings are intended to be illustrative in nature and are not meant to be interpreted as limiting the following claims.

I claim:

1. An information display system for use in a telephone answering machine having a memory for recording messages, said display system for indicating when messages are available for playback, said system comprising:
    an array of visual display units corresponding to banks within the memory of said machine for recording separate messages, each of which units include a first light emitting diode for generating light of a first color and second light emitting diode for generating light of a second color;
    a plurality of means, one of which is associated with each of said display units, for regulating current flow through the first and the second light emitting diodes of the visual display unit with which each means for regulating current flow is associated in order to thereby generate either light of said first color or light of said second color in response to a digital control signal; and
    microprocessor means for providing digital control signals to said plurality of means for regulating current flow, said control signals having logic states set to reflect the utilization status of the banks within said memory of said machine and the presence or absence of messages in said memory.

2. The display system of claim 1, wherein each of said means for regulating current flow includes:
    a first transistor connected to receive one of said control signals provided by said microprocessor means to one of said means for regulating current flow and connected to provide current flow through the first diode in the display unit with which said one of said means for regulating current flow is associated when the logic state of said control signal is high,
    means for inverting said control signal in order to form an inverted control signal, and
    a second transistor connected to receive said the inverted control signal and connected to provide current flow through the second diode in this display unit when said control signal is low.

3. The display of claim 1, wherein said microprocessor means is operative for continuously updating the control signals provided to said plurality of means for regulating current flow in accordance with the utilization status of the memory banks within said answering machine by interrupting the other operations of said microprocessor means on the periodic basis.

4. The display system of claim 1, wherein said microprocessor means also provides control signals to said plurality of means for regulating current flow which periodically toggle between logic states in order to reflect a additional type of utilization status for the memory banks.

5. A display system for use in a telephone answering machine for indicating the presence of messages in the memory of the machine, comprising:
    a plurality of display modules each of which corresponds to a separate block of said memory adapted for holding a message, each of said modules including:
    a first light emitting device for generating light of a first color;
    a first transistor for regulating current flow to said first device in response to a control signal applied to the base of said first transistor,
    means for inverting said control signal in order to form an inverted control signal;
    a second light emitting device for generating light of a second color which is positioned in proximity to said first device;
    a second transistor for regulating current flow to said second device in response to said inverted control signal applied to the base of said second transistor; and
    microprocessor means for providing a control signal to each of said display modules, said control signals formed to assume one logic state if the memory bank operationally corresponding to the display module to which the control signal is supplied is empty and another logical state if the memory bank operationally corresponding to the display module to which the control signal is supplied contains a message.

6. The display system of claim 5, wherein said microprocessor means provides control signals which toggle between logic states when the memory block corresponding the display module to which the control signal is supplied contains a memo-message in order to form a visual display signal which is a composite of light from said first device and light from said second device.

7. A message management and display system for use in a telephone answering machine having a memory for recording messages, comprising:
 a display system for visually indicating on a message by message basis whether one or more messages are available for playback, said display system including a plurality of visual display modules corresponding to banks within said memory adapted for holding separate messages and each of which includes a means for generating light of a first color and, alternatively, light of a second color in response to different logic states assumed by a control signal;
 microprocessor means operative for providing control signals formed to assume one logic state if the memory bank operationally corresponding to the display module to which the control signal is supplied is empty and another logic state if the memory bank operationally corresponding to the display module to which the control signal is supplied contains a message, and operative for selecting any of the messages indicated by any of said display modules as recorded in the memory of said machine for playback by randomly accessing said messages in response to input commands provided through an input device by an operator of said machine.

8. The system of claim 7, wherein said display modules each include:
 a first light emitting device for generating light of said first color;
 a first transistor for regulating current flow to said first device in responee to a control signal applied to the base of said first transistor,
 means for inverting said control signal in order to form an inverted control signal;
 a second light emitting device for generating light of said second color which is positioned in proximity to said first device;
 a second transistor for regulating current flow to said second device in response to said inverted control signal applied to the base of said second transistor.

9. A display system for use in a telephone answering machine having memory banks for recording separate messages, said system for indicating when messages are available for playback, said system comprising:
 a plurality of display module means operationally corresponding to said memory banks for emitting display signals in the form of light of either a first color, a second color or, alternately, a third color in response to control signals from a microprocessor means; and
 microprocessor means for generating said control signals by tracking the utilization status of the memory banks within said machine and forming control signals which regulate the display module means to emit light of said first color when a message is present in a memory bank corresponding to the display module means, light of said second color when a locally recorded memo-message is present in said memory bank or light of a third color when said memory bank is empty.

10. The system of claim 9, wherein said microprocessor means also forms particular control signals so that they regulate said module means to flash at low frequency when messages or memo-messages in the memory banks corresponding to the module means are selected for special processing such as playback.

* * * * *

UNITED STATES PATENT AND TRADEMARK OFFICE
CERTIFICATE OF CORRECTION

PATENT NO. : 4,794,638  
DATED : December 27, 1988  
INVENTOR(S) : Peter M. Millett Page 1 of 2

It is certified that error appears in the above-identified patent and that said Letters Patent is hereby corrected as shown below:

```
Column 1, line 68, after "of" delete "a".
Column 2, lines 11 and 12, change "accoraance" to
   --accordance--.
Column 3, line 53, change "oould" to --would--.
Column 4, line 61, change "nodes" to --anodes--.
Column 5, line 6, change "54l-54b" to --54a-54g--.
Column 6, line 60, after "whether" delete "the".
Column 6, line 61, change "Keyboard" to --keyboard--.
Column 8, line 45, change "signficance" to --significance--.
Column 8, line 50, change "Step" to --step--.
Column 8, line 53, change "eqiivalent signficance" to
   --equivalent significance--.
Column 8, line 57, change "signficance" to --significance--.
Column 8, line 68, after "numbers" insert --of--.
Column 9, line 2, after "may" insert --be--.
Claim 1, column 9, line 58, change "include" to
   --includes--.
Claim 4, column 10, line 34, change "a" to --an--.
Claim 6, column 11, line 1, before "the" (first occurrence)
   insert --to--.
```

UNITED STATES PATENT AND TRADEMARK OFFICE
CERTIFICATE OF CORRECTION

PATENT NO. : 4,794,638

DATED : December 27, 1988

INVENTOR(S) : Peter M. Millett

It is certified that error appears in the above-identified patent and that said Letters Patent is hereby corrected as shown below:

Claim 8, column 12, line 2, change "responee" to -- response --.

Signed and Sealed this

Twenty-ninth Day of August, 1989

Attest:

DONALD J. QUIGG

*Attesting Officer*   *Commissioner of Patents and Trademarks*